United States Patent

Zhang et al.

[11] Patent Number: 6,104,974
[45] Date of Patent: Aug. 15, 2000

[54] SYSTEM FOR VARYING THE GEAR RATIO FOR A MULTI-STEP TRANSMISSION

[75] Inventors: Hong Zhang, Regensburg; Helmut Denz, Stuttgart, both of Germany

[73] Assignee: Robert Bosch GmbH, Stuttgart, Germany

[21] Appl. No.: 09/029,508

[22] PCT Filed: May 31, 1997

[86] PCT No.: PCT/DE97/01094

§ 371 Date: May 11, 1998

§ 102(e) Date: May 11, 1998

[87] PCT Pub. No.: WO98/00658

PCT Pub. Date: Jan. 8, 1998

[30] Foreign Application Priority Data

Jun. 29, 1996 [DE] Germany .......................... 196 26 241
Mar. 15, 1997 [DE] Germany .......................... 197 10 919

[51] Int. Cl.[7] .................................................. G06F 7/00
[52] U.S. Cl. ........................ 701/51; 701/54; 701/55; 701/56; 477/110; 477/121; 477/156
[58] Field of Search ................... 701/51, 58, 59, 701/61, 55, 56, 62, 64, 53, 54; 477/154, 155, 109, 110, 121, 156

[56] References Cited

U.S. PATENT DOCUMENTS

| | | | |
|---|---|---|---|
| 4,228,700 | 10/1980 | Espenschied et al. | 477/154 |
| 5,325,740 | 7/1994 | Zhang et al. | 477/110 |
| 5,407,401 | 4/1995 | Bullmer et al. | 477/110 |
| 5,603,672 | 2/1997 | Zhang | 477/110 |

FOREIGN PATENT DOCUMENTS

| | | |
|---|---|---|
| 42 32 974 | 4/1994 | Germany . |
| 42 39 711 | 6/1994 | Germany . |
| 44 07 475 | 9/1995 | Germany . |

*Primary Examiner*—Jacques H. Louis-Jacques
*Attorney, Agent, or Firm*—Kenyon & Kenyon

[57] ABSTRACT

A system for changing the gear ratio with a multi-step reduction gear, where a flywheel is accelerated or decelerated during a change in gear ratio. The flywheel, consisting essentially of engine components and the converter, must be accelerated in downshifting operations, for example, while the flywheel is decelerated in upshifting operations. To change the gear ratio, at least two different selectable strategies are given. A first value representing the engine output torque and a second value representing the torque demand for acceleration or deceleration of the flywheel are detected first. To change the gear ratio, one of the above-mentioned strategies is then selected, depending on a comparison of the first value detected with the second value detected. To determine the engine output torque in the actual shifting operation, it is predicted from the instantaneous load signal and parameters that depend on the throttle valve angle.

12 Claims, 6 Drawing Sheets

SYSTEM FOR VARYING THE GEAR RATIO FOR A MULTI-STEP TRANSMISSION

FIELD OF THE INVENTION.

The present invention relates to a system for changing the gear ratio in a multi-step reduction gear, of the definition of the species of claim 1.

BACKGROUND INFORMATION

It is known from the related art, as represented by European Patent No. 0 001,298 (corresponding to U.S. Pat. No. 4,228,700), that when changing gears with an automatic multi-step reduction gear, the respective gear shift valves can be driven as a function of whether the engine is in pushing (coasting) or pulling (traction) operation. By linking a pushing or pulling operation detected with the type of gear shifting (upshifting or downshifting), a gear shifting strategy can be selected to permit the most comfortable and gear-protective adjustment of engine speed to the new gear. In particular, the intent is for the shifting of the required gear shift valves at the start of the shifting operation to take place with a positive overlap, namely at the start of the shifting sequence in power upshifting and in pushing downshifting and at the end of the shifting sequence in pushing upshifting and power downshifting.

German Patent Application No. 42 32 974 (corresponds to British Patent No. 2,271,198) and German Patent Application No. 42 39 711 discribe a model for calculating the indexed engine torque as a function of engine speed, engine load, firing angle, ignition blanking stages and of loss torque as a function of engine speed, engine load, engine temperature and consumers (e.g., a.c. compressor). In German Patent Application No. 44 07 475, this engine torque model for calculating the indexed engine torque is supplemented by the lambda function, i.e., the dependence on the fuel-air ratio. These publications disclose the precise calculation of instantaneous engine output torque at each operating point.

SUMMARY OF THE INVENTION

An object of the present invention is to provide for a simple and accurate selection of gear shifting strategies in changing gear in multi-step reduction gears.

The present invention is based on a system for changing the gear ratio in a multi-step reduction gear, where a flywheel is accelerated or decelerated during a change in gear ratio. The flywheel, consisting essentially of engine components and the converter, must be accelerated in downshifting operations, for example, whereas the flywheel is decelerated in upshifting operations. To change the gear ratio, at least two different selectable strategies are provided.

An important feature of the present invention is that a first value representing the engine output torque and a second value representing the torque demand for accelerating or decelerating the flywheel are detected first. To change the gear ratio, one of the strategies mentioned above is then selected on the basis of a comparison of the first value detected with the second value detected.

As mentioned above, methods are known from the related art for selecting different shifting strategies for changing the gear ratio according to whether pushing or pulling operation of the motor vehicle is detected. This detection of pushing or pulling depends on the instantaneous throttle valve angle detected. However, this method is inaccurate and application is relatively complicated. The present invention offers the advantage that it permits very accurate recognition of whether the gear shifting to be initiated is a pushing or pulling shifting. In addition, the system according to the present invention can be applied relatively easily. Other functions of engine control, e.g., heating of the catalyst, have no effect on pushing or pulling detection according to the present invention.

An advantageous exemplary embodiment of the present invention provides for detecting as the type of change in gear ratio change whether there is a change to a higher gear (upshifting) or to a lower gear (downshifting) and whether the strategies are selected as a function of this detected type change. The aim of the exemplary embodiment is that in addition to the torque comparison according to this invention, the type of shifting is also used to select the shifting strategies. Depending on the comparison of the first value detected and the second value detected according to the present invention, it is detected whether there is pushing operation or pulling operation, with the suitable shifting strategy being selected according to whether pulling or pushing operation is detected.

To detect the second value which represents the torque demand for acceleration or deceleration of the flywheel, it is possible to provide for a period of time to be preselected for the change in gear ratio. Here, to detect the second value (torque demand for accelerating or decelerating the flywheel) the difference between the input rotational speed of the engine and/or gear before and after the change in gear ratio is determined. The difference thus determined is linked to the predetermined period of time and the moment of inertia of the flywheel and/or the moment of inertia of a torque converter arranged between the vehicle engine and the gear to form the torque demand.

In another advantageous exemplary embodiment of the present invention, the comparison of the first value detected (engine output torque) with the second value detected (torque demand for accelerating or decelerating the flywheel) is provided with a preselectable hysteresis. This hysteresis can be predetermined, depending on the type of change detected (upshifting or downshifting).

If a gear shifting operation is to be initiated, the engine output torque at this time does not correspond exactly to the engine output torque that will prevail in the actual gear shifting operation. This occurs in particular due to dead time in building up and dissipating the hydraulic pressure on the gear couplings. For this reason, an output engine torque which is predicted into the future is desired for an accurate selection of the shifting strategy to compensate for these dead times in building up and dissipation of the hydraulic pressure on the gear couplings. For this reason, in an advantageous exemplary embodiment, a predicted engine output torque is determined as a first value for the engine output power, the prediction being based on the current engine output torque prevailing on initiation of the intended shifting. To determine the predicted engine output torque, the engine output torque in the actual shifting operation, it can be predicted from the current load signal and parameters that depend on the throttle valve angle.

To determine the predicted engine output torque, values representing the engine load and/or the engine speed can be determined. In particular, a preselectable prediction time may be provided to detect the change in engine load. As an alternative, values representing the change in pressure and temperature upstream from the throttle valve of the motor vehicle engine may be measured. In particular, the values thus determined may be used to correct a load signal derived from the measured engine speed and the measured position of the throttle valve. In this exemplary embodiment, the engine load signal calculated from the throttle valve position and the engine speed and corrected with the pressure and temperature upstream from the throttle valve is thus used to determine the predicted engine output torque.

DETAILED DESCRIPTION OF THE INVENTION

Figure 1A:
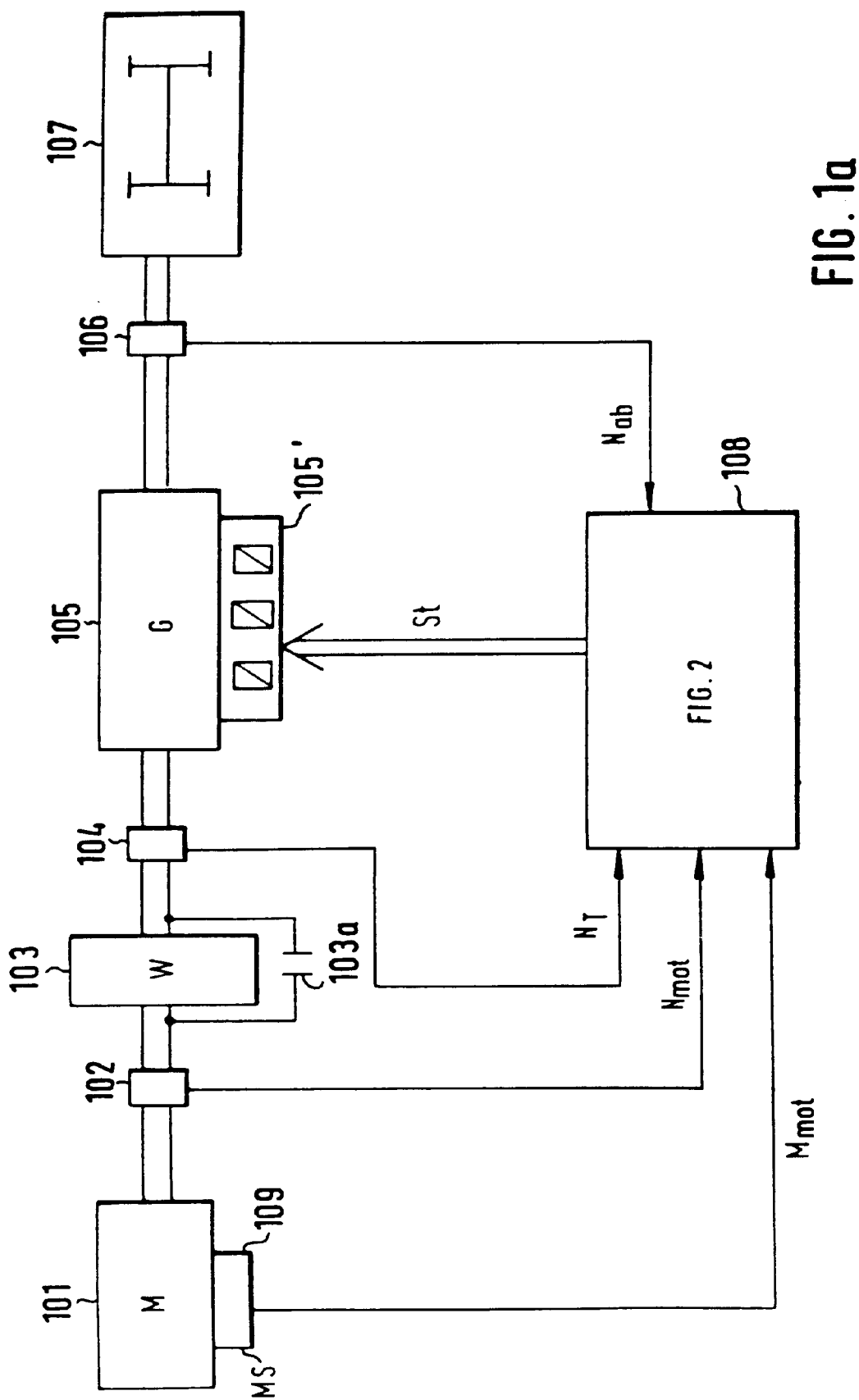
FIG. 1a shows a block diagram of a first embodiment of the present invention.

German Patent Application Nos. 42 39 711 and 42 32 974, mentioned above, describe a model for estimating the indexed engine torque $Mi_{mot,ist}$ as a function of engine speed, engine load, firing angle and blanking stages. In addition, it is known that the loss torque $M_{mot,verl}$ can be determined as a function of engine speed, engine load, engine temperature and as a function of consumers (e.g., an air conditioner compressor). In German Patent Application No. 44 07 475 mentioned above, the engine torque model for calculation of the indexed engine torque is supplemented by the lambda function. Thus the fuel-air ratio is also taken into account in calculating the indexed engine torque. The engine output torque $M_{mot}$, which is also called the coupling torque in the case of a gear mechanism, is obtained by subtracting the above-mentioned engine loss torque from the indexed engine torque as follows:

$$M_{mot}=Mi_{mot,ist}-M_{mot,verl} \quad (1)$$

FIGS. 1a through 1d show block diagrams of various exemplary embodiments of the present invention, the same blocks being marked with the same notation.

Automobile engine 101 is controlled and regulated by engine control unit 109. Engine speed $N_{mot}$ is detected by speed sensor 102. Torque converter 103 mounted between automobile engine 101 and automatic transmission 105 can be bridged by closing coupling 103a. Gear input speed $N_T$ of transmission 105 is measured by speed sensor 104. Gear output speed $N_{ab}$ is detected by speed sensor 106 and relayed to the vehicle wheels schematically shown in block 107.

The shifting operations of transmission 105 are actuated by shifting valves 105'. These shifting valves are acted upon by automatic transmission control 108 with shifting strategy St. The upshifting and downshifting operations are actuated in general in automatic transmission control 108 as a function of the engine load (not shown) and the gear output speed $N_{ab}$. In addition, automatic transmission control 108 receives engine speed $N_{mot}$ and gear input speed $N_T$ as well as engine torque $M_{mot}$ from engine control unit 109.

During a downshifting operation, the engine speed must be ramped up directly by the automobile engine in the case of pulling operation of the automobile engine. The speed difference ΔN before and after a downshifting operation is obtained from the change in gears between the new gear speed $i_{neu}$ and the old gear speed $i_{alt}$ with a closed converter coupling 103a:

$$\Delta N=N_{mot,alt}(i_{neu}/i_{alt}-1) \quad (2)$$

where:

ΔN:difference between the engine speed before and after the shifting operation $N_{mot,alt}$:engine speed before leaving the old synchronization point $i_{neu}$:gear ratio of the new gear speed $i_{alt}$:gear ratio of the old gear speed In the case of an open converter coupling 103a, equation 2 must be corrected by the converter slip (ratio of engine speed to the input gear speed) before and after a shifting operation.

Let us assume as given the shifting time $T_{schalt}$ within which the engine speed $N_{mot}$ is to be increased from the synchronous point of the old gear speed to the synchronous point of the new gear speed. This yields a theoretical acceleration of the flywheel:

$$dN/dt'\Delta N/T_{schalt} \quad (3)$$

The torque demand $M_{schwung}$ to accelerate the flywheel is obtained as:

$$M_{schwung}=\beta \cdot (2\pi \cdot dN/dt) \quad (4)$$

where β denotes the sum of the moment of inertia of the flywheel and the moment of inertia of the torque converter.

According to the present invention, the shifting strategy "pulling" is recognized for downshifting when the engine output torque $M_{mot}$ is greater than the torque demand $M_{schwung}$ for accelerating the moment of inertia. Here the shifting strategy "pulling downshifting" is selected.

If the engine output torque $M_{mot}$ is less than the torque demand $M_{schwung}$, "pushing" is recognized and the shifting strategy "pushing downshifting" is selected. In determining the engine output torque $M_{mot}$, an engine torque reduction during gear shifting, a so-called automatic transmission control engine torque reduction, is disregarded.

In equation 5 below, a torque hysteresis in recognition of pushing-pulling for downshifting is incorporated in addition to the comparison according to the present invention.

$M_{mot}>M_{schwung}$:"pulling downshifting"

$M_{mot}<(M_{schwung}-M_{hysr})$:"pushing downshifting" (5)

where $M_{hysr}$ is the moment hysteresis in recognition of pushing-pulling for downshifting.

In an upshifting operation, the pushing strategy for the automatic transmission control is used when the engine output torque $M_{mot}$ is less than the torque demand $M_{schwung}$ (see equation 4), where the torque demand $M_{schwung}$ is negative here:

$M_{mot}<M_{schwung}$:"pushing upshifting"

$M_{mot}>(M_{schwung}+M_{hysh})$:"pulling upshifting" (6)

where $M_{hysh}$ is the moment hysteresis in recognition of pushing-pulling for upshifting.

Figure 2:
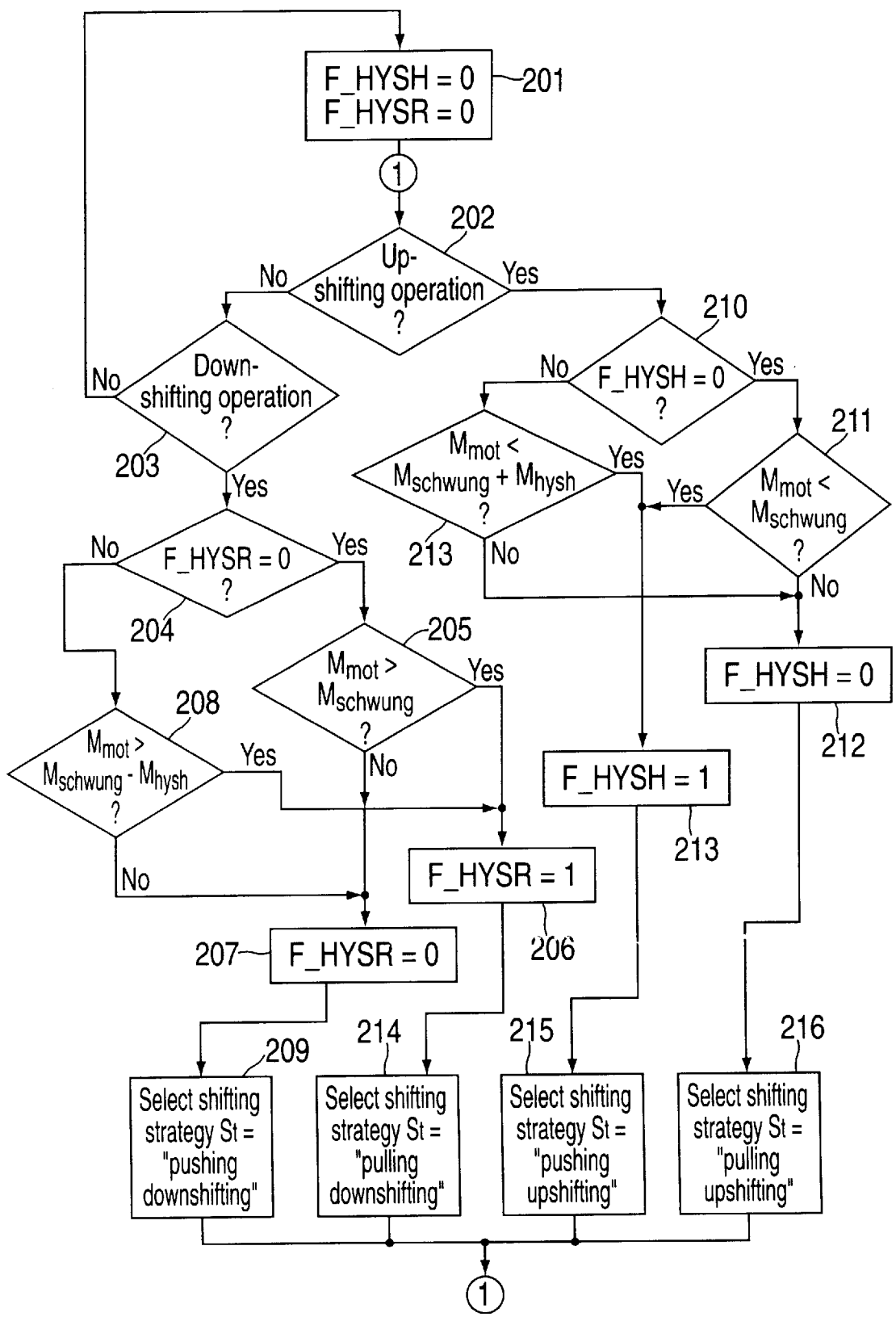
FIG. 2 shows a flow chart of the present invention.

FIG. 2 shows the procedure described above for determining the shifting strategy.

In step 201 the parameters F_HYSH and F_HYSR are set at the value zero. A query is made in step 202 to determine whether the pending shifting operation is an upshifting operation. If this is not the case, then a query in step 203 determines whether a downshifting operation is intended. If this is also not the case, then obviously no shifting operation is intended, whereupon it returns to step 201.

If it is found in step 203 that a downshifting operation is intended, then step 204 ascertains whether the parameter F_HYSR has a value of zero. If this is the case, a check is performed in step 205 to determine whether the engine output torque $M_{mot}$ is greater than the torque demand $M_{schwung}$. If this is the case, then in step 214 the shifting strategy St "pulling downshifting" is selected on the basis of step 206 (parameter F_HYSR is set at the value one). If this is not the case, in step 209 the shifting strategy St "pushing downshifting" is selected on the basis of step 207 (parameter F_HYSR is set at the value zero).

If it is found in step 204 that parameter F_HYSR has a value of one (in step 206 which has previously been executed), then in step 208 a check is performed to determine whether the engine output torque $M_{mot}$ is greater than the torque demand $M_{schwung}$ minus the above-mentioned hysteresis value $M_{hysr}$. If this is the case, then in step 214 the shifting strategy St "pulling downshifting" is selected on the basis of step 206 (parameter F_HYSR is set at the value one). If this is not the case, then in step 207 (parameter F_HYSR is set at the value zero) the shifting strategy St "pushing downshifting" is selected on the basis of step 207.

If it is found in step 202 that an upshifting operation is intended, then step 210 ascertains whether the parameter F_HYSH has a value of zero. If this is the case, then a check is performed in step 211 to determine whether the engine output torque $M_{mot}$ is less than the torque demand $M_{schwung}$ If this is the case, then in step 215 the shifting strategy "pushing upshifting" is selected on the basis of step 213. If this is not the case, then in step 216 the shifting strategy St "pulling upshifting" is selected on the basis of step 212 (parameter F_HYSH is set at the value zero).

If it is found in step 210 that parameter F_HYSH (in step 213 which was executed previously) has a value of one, then a check is performed in step 213 to determine whether the engine output torque $M_{mot}$ is less than the torque demand $M_{schwung}$ plus the above-mentioned hysteresis value $M_{hysh}$. If this is the case, then in step 215 the shifting strategy St "pushing upshifting" is selected on the basis of step 213 (parameter F_HYSH is set at the value one). If this is not the case, then in step 216 the shifting strategy St "pulling upshifting" is selected on the basis of step 212 (parameter F_HYSH is set at the value zero).

The torque demand $M_{schwung}$ for accelerating the flywheel is calculated according to equations 2, 3 and 4.

Figure 3:
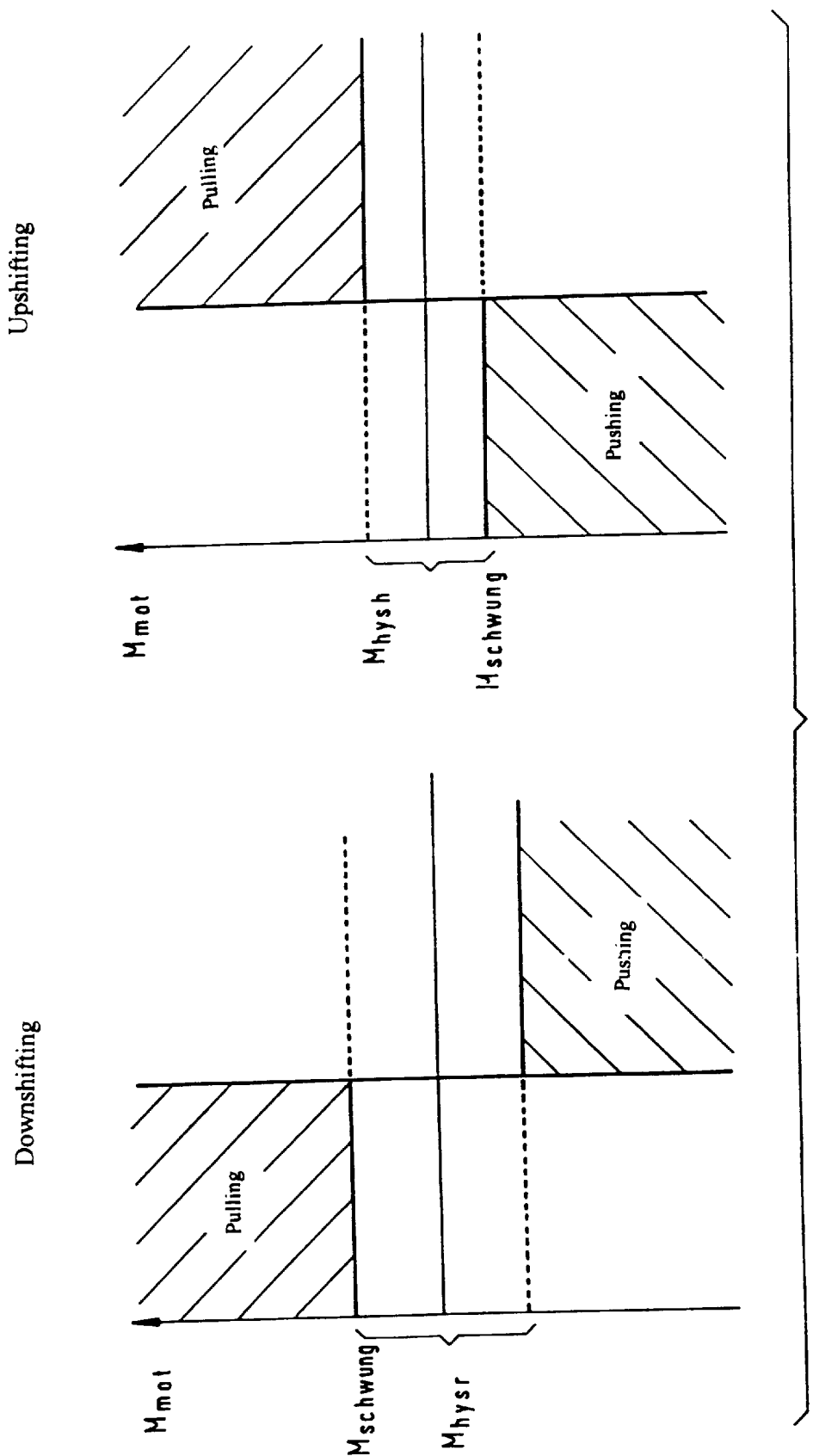
FIG. 3 illustrates the hysteresis characteristic.

The diagrams in FIG. 3 show the influence of hysteresis $M_{hysh}$ and $M_{hysr}$.

The estimated engine output torque $M_{mot}$ represents the output torque achieved instantaneously on the automobile engine. However, for the detection of pushing-pulling according to the present invention, an engine output torque predicted into the future is desired to compensate for the dead time in building up and dissipating the hydraulic pressure on the gear couplings. Three possibilities of predicting the engine output torque are to be presented here.

1$^{st}$ option:

The charge signal $t_1$ used to calculate the indexed engine torque is predicted into the future:

$$t_{1,pr} = t_1 + (t_{prae} \cdot dt_{1w}/dt) \quad (7)$$

where $t_1$: instantaneous charge $t_{1,pr}$: predicted charge signal $t_{prae}$: prediction time horizon $t_{1w}$: equivalent charge calculated from the throttle valve angle ($\alpha_{Dk}$) and engine speed ($N_{mot}$) according to the predetermined function $F(\alpha_{Dk}, N_{mot})$ $dt_{1w}/dt$: gradient of the equivalent charge The charge signal $t_{1,pr}$ thus calculated is used for the calculation of the indexed engine torque, which is essentially known from the related art mentioned in the preamble, and also for calculation of the actual engine output torque $M_{mot}$ instead of $t_1$. The prediction horizon $t_{prae}$ depends on the type of shifting (for example, whether shifting gears from the second gear speed to the third or from the third to the second). This exemplary embodiment is shown in FIG. 1c. The variables required in equation 7 are supplied to block 111 by engine control unit 109". The prediction horizon $t_{prae}$ is sent to block 111 by the automatic transmission control 108 depending on the type of shifting. According to equation 7, the predicted charge signal is calculated, whereupon the engine output torque $M_{mot}$ is calculated in block 112 at the time when the gear speed change actually takes place in transmission 105 using the model known from the related art mentioned above.

Figure 1B:
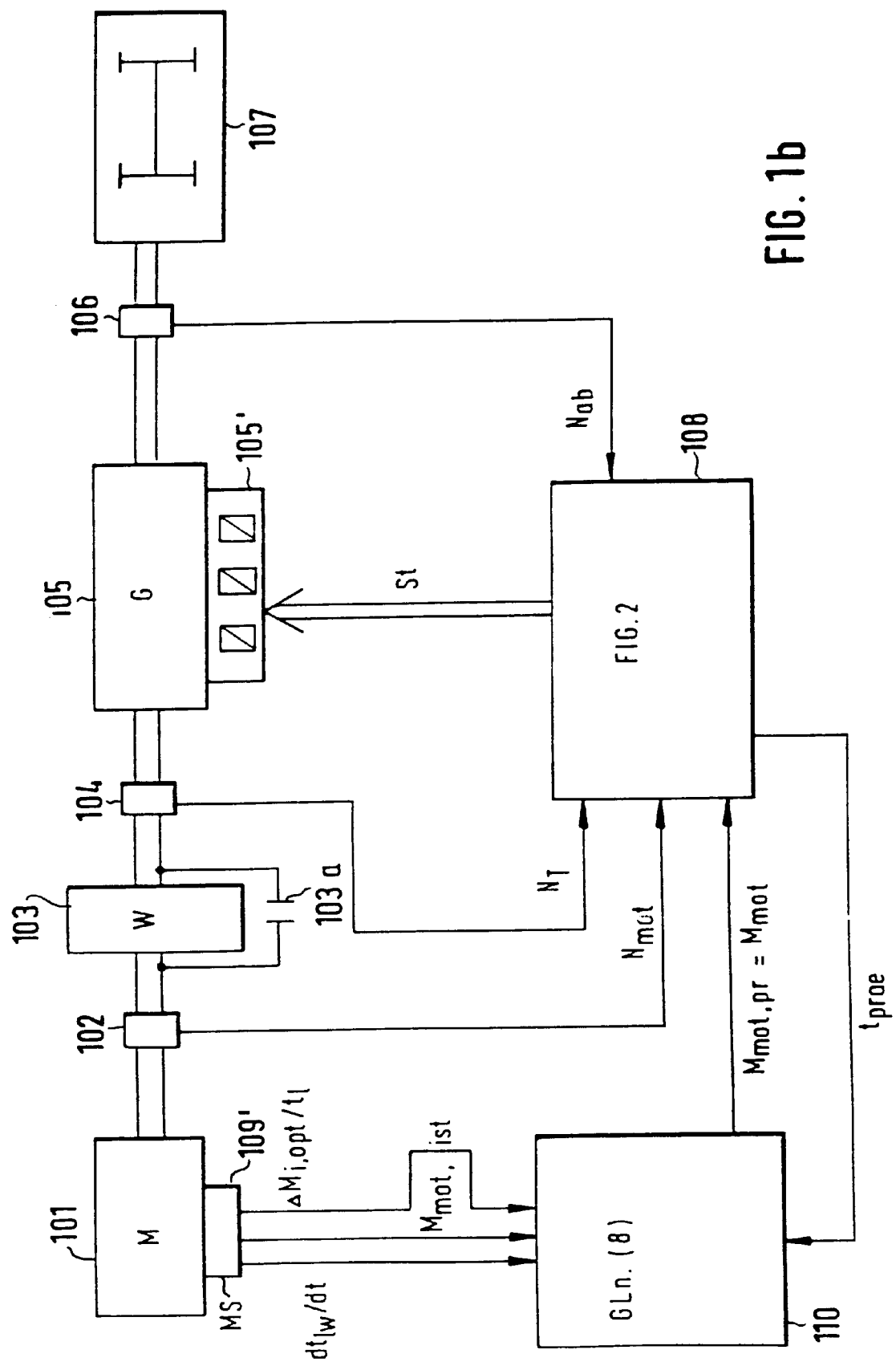
FIG. 1b shows a block diagram of a second embodiment of the resent invention.
Figure 1C:
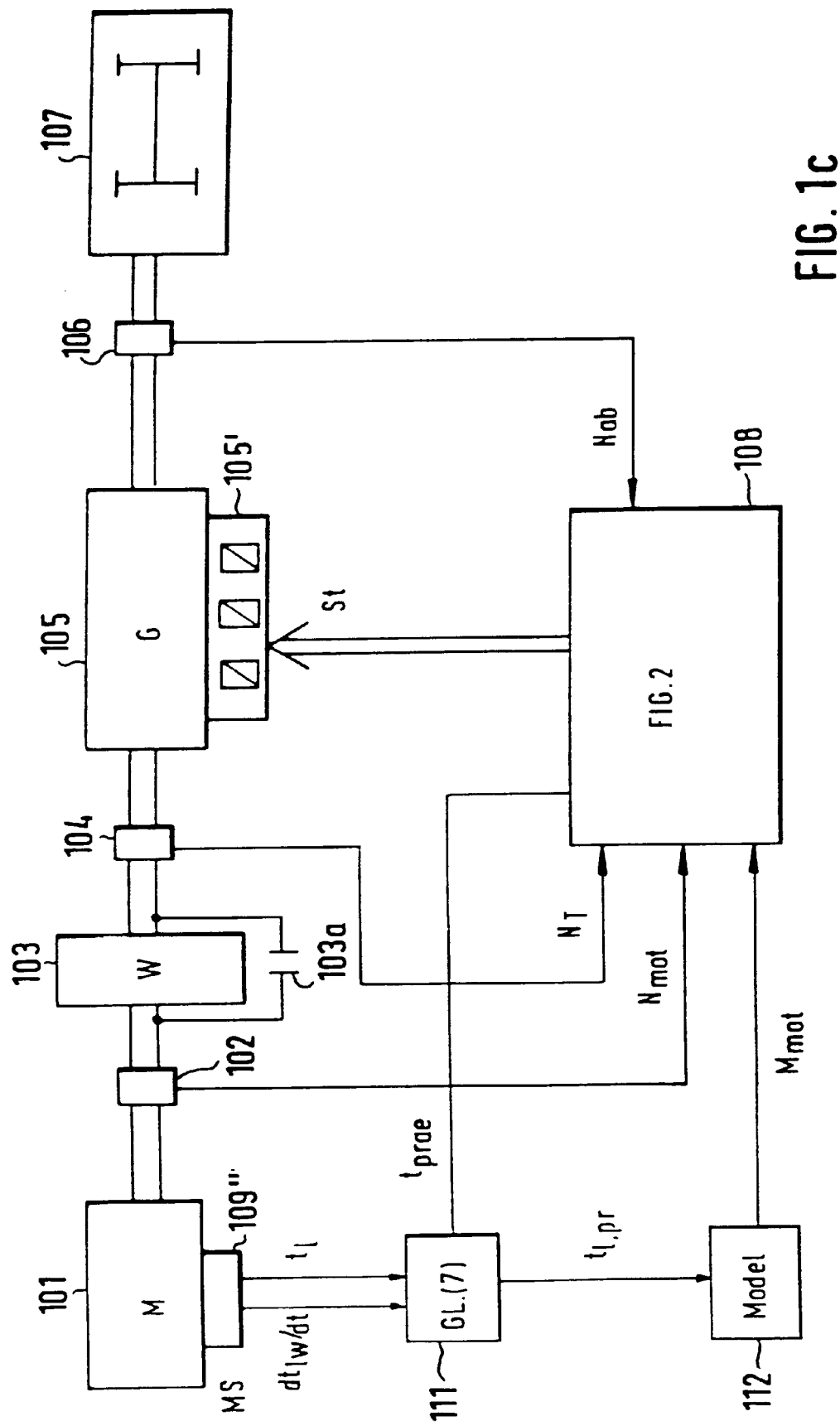
FIG. 1c shows a block diagram of a third embodiment of the present invention.

2$^{nd}$ option:

A correction term is added to the calculated instantaneous actual engine output torque $M_{mot,ist}$ (without the above-mentioned automatic transmission control engine torque reduction):

$$M_{mot,pr} = M_{mot,ist} + (\Delta M_{i,opt}/\Delta t_1) * dt_{1w}/dt * t_{prae} \quad (8).$$

where $M_{mot,pr}$: engine output torque predicted into the future around the prediction time horizon $t_{prae}$, $\Delta M_{i,opt}/\Delta t_1$: change in the indexed transmission input torque and engine output torque per change in the charge, $t_{prae}$: prediction time horizon, $t_{1w}$: equivalent charge calculated from the throttle valve angle ($\alpha_{Dk}$) and the engine speed ($N_{mot}$) according to the predetermined function $F(\alpha_{Dk}, N_{mot})$ $dt_{1w}/dt$: gradient of the equivalent charge This procedure is illustrated in FIG. 1b. The variables needed in equation 8 are made available to block 110 by engine control unit 109' and automatic transmission control 108. The engine output torque thus corrected is used to select the pushing or pulling shifting strategy in automatic transmission control 108 as shown in FIG. 2.

Figure 1D:
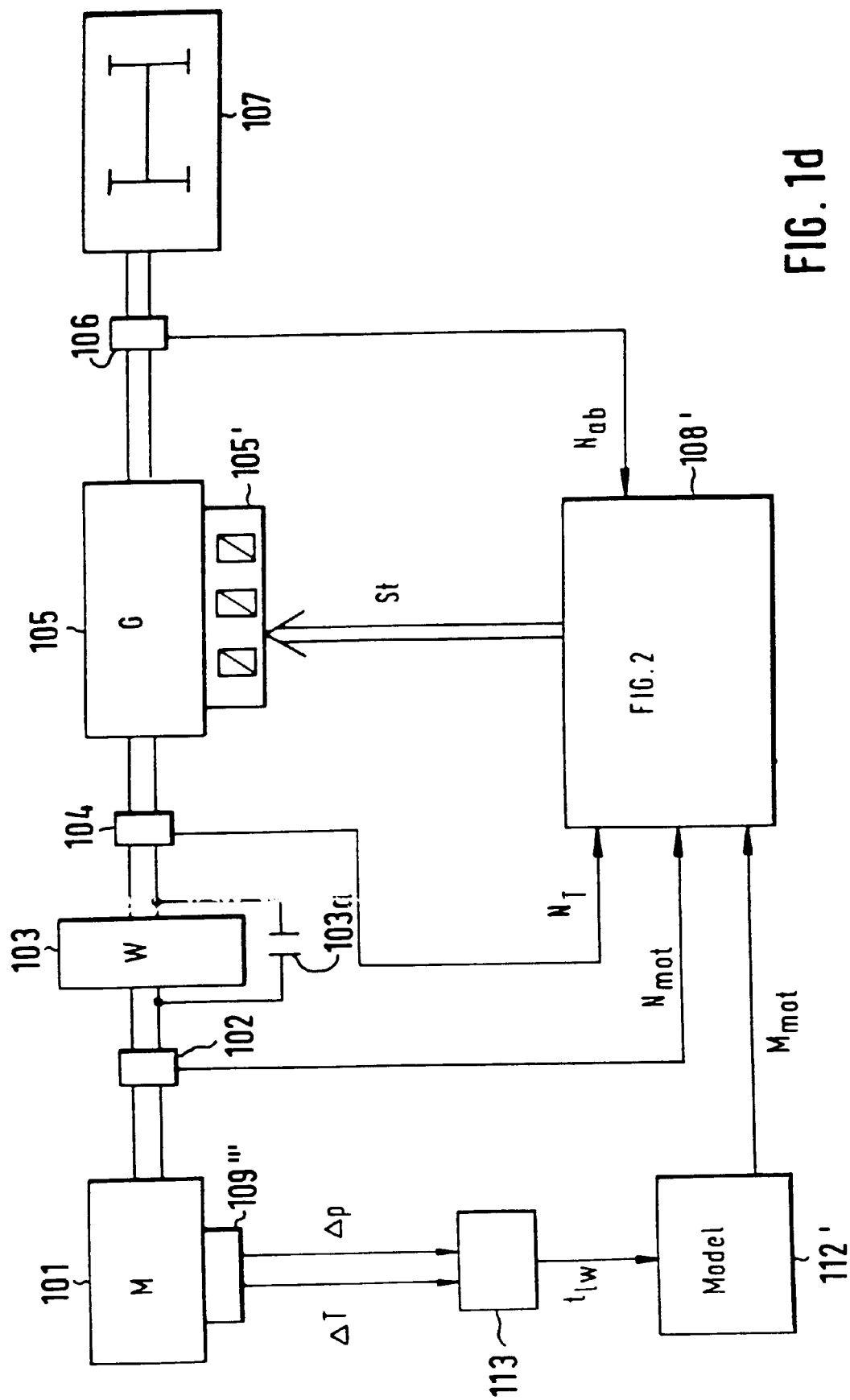
FIG. 1d shows a block diagram of a fourth embodiment of the present invention.

3$^{rd}$ option:

FIG. 1d shows another option. An equivalent charge signal $t_{1v}$ is used here as the anticipated driver's intended torque for the calculation to determine the predicted engine output torque, taking into account the change in pressure $\Delta p$ and the change in temperature $\Delta T$ upstream from the throttle valve. It is provided in particular here that the engine load signal calculated from the throttle valve position and the engine speed and corrected with the pressure and temperature upstream from the throttle valve is used to determine the predicted engine output torque. This variant is relatively simple, but it has the disadvantage that the prediction lead cannot be selected variably.

What is claimed is:

1. A system for changing a gear ratio in a multi-step reduction gear, the system comprising:

a flywheel coupled to the multi-step reduction gear; and a controller using one of a plurality of strategies for changing the gear ratio, wherein the controller determines a first value corresponding to an engine output torque and a second value corresponding to a torque demand for one of an acceleration and a deceleration of the flywheel resulting from an upcoming gear ratio change and wherein, as a function of a comparison between the first and second values, the controller selects from the plurality of strategies, a strategy to be used in changing the gear ratio.

2. The system according to claim 1, wherein the controller selects the strategy for the upcoming gear ratio change based on whether the change is to a gear ratio higher than a present gear ratio.

3. The system according to claim 2, wherein the controller selects a predetermined hysterisis based on whether the upcoming gear ratio change is to a gear ratio higher than a present gear ratio.

4. The system according to claim 1, wherein the controller determines, based on the comparison between the first and second values, whether the operation type is a pushing operation and wherein the controller selects the strategy to be used based on this determination.

5. The system according to claim 4, wherein the pushing operation is a coasting operation, and wherein the pulling operation is a traction operation.

6. The system according to claim 1, wherein the controller determines the second value based on a predetermined period of time required to complete the upcoming gear ratio change.

7. The system according to claim 6, wherein the controller determines the second value based on one of a first difference value between a current engine input speed and a final engine input speed after the upcoming gear change and a second difference value between a current gear input speed and a final gear input speed after the upcoming gear ratio change.

8. The system according to claim 7, wherein, for determining the second value, the controller links the difference value to at least one of the predetermined period of time, a moment of inertia of the flywheel and a moment of inertia of a torque converter arranged between an engine and a gear.

9. The system according to claim 1, wherein the controller incorporates a predetermined hysterisis into the comparison between the first and second values.

10. The system according to claim 9, wherein controller sets the predetermined hysterisis based on whether the upcoming gear ratio change is to a gear ratio higher than a present gear ratio.

11. The system according to claim 1, wherein the controller determines a predicted engine output torque value as a function of the first value.

12. The system according to claim 11, wherein the controller determines the predicted engine output torque value by one of:

detecting one of an engine load value and a first change value corresponding to a change in the engine load during a predetermined prediction time; and detecting a second change value corresponding to one of a temperature change and a pressure change upstream of an engine throttle valve, wherein a load signal determined as a function of a detected engine speed and a position of the throttle valve is corrected by the controller based on the second change value.

\* \* \* \* \*

UNITED STATES PATENT AND TRADEMARK OFFICE
CERTIFICATE OF CORRECTION

PATENT NO. : 6,104,974
DATED : August 15, 2000
INVENTOR(S) : Zhang et al.

It is certified that error appears in the above-identified patent and that said Letters Patent is hereby corrected as shown below:

Column 1,
Lines 4 and 5, delete ", of the definition of the species of claim 1".

Column 4,
line 20, change "$dN/dt\,\nabla N/T_{schall}$" to -- $DN/dt = \nabla N/T_{schalt}$ --.

Signed and Sealed this

Ninth Day of October, 2001

Attest:

NICHOLAS P. GODICI
Attesting Officer
Acting Director of the United States Patent and Trademark Office